No. 683,057. Patented Sept. 24, 1901.
W. J. MURRAY.
DEVICE FOR PREVENTING REFILLING OF VESSELS.
(Application filed Jan. 23, 1900.)
(No Model.)
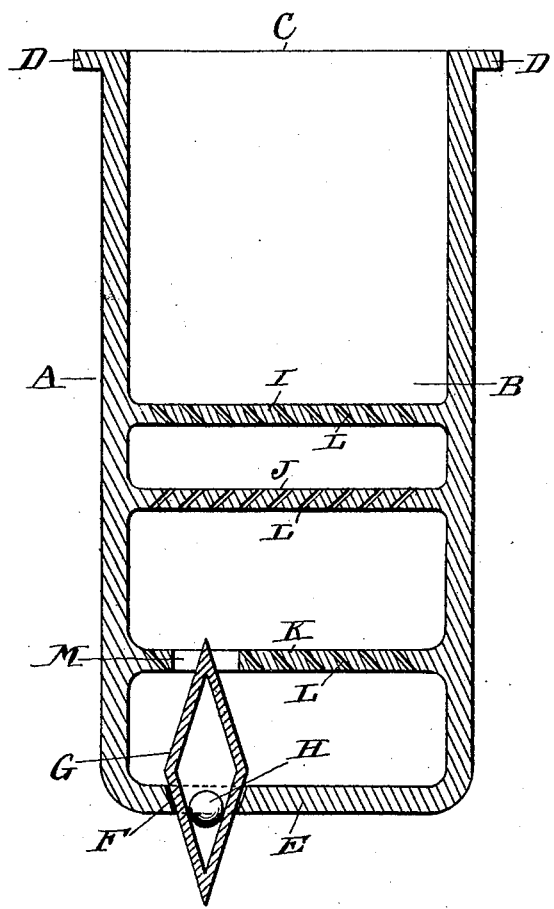
Witnesses
C. A. Swann
Geo. E. Chapman
Inventor
William J. Murray
by Blackwood Bros.
his Attorneys
THE NORRIS PETERS CO., PHOTO-LITHO., WASHINGTON, D. C.

UNITED STATES PATENT OFFICE.

WILLIAM JOSEPH MURRAY, OF NEW YORK, N. Y.

DEVICE FOR PREVENTING REFILLING OF VESSELS.

SPECIFICATION forming part of Letters Patent No. 683,057, dated September 24, 1901.

Application filed January 23, 1900. Serial No. 2,556. (No model.)

*To all whom it may concern:*

Be it known that I, WILLIAM JOSEPH MURRAY, a citizen of the United States, residing at New York city, in the county of New York and State of New York, have invented certain new and useful Improvements in Devices for Preventing the Refilling of Vessels; and I do hereby declare the following to be a full, clear, and exact description of the invention, such as will enable others skilled in the art to which it appertains to make and use the same.

My invention relates to an improvement in a device for preventing the refilling of vessels, and has for its object to provide a device which is simple and inexpensive in construction and easy to operate and also to provide a stopper that can be fixed in the neck of a bottle or any other vessel and while therein will allow the contents of said vessel to be poured out, but which will not permit the entrance of liquid therein.

It consists of the features and combination of features, as hereinafter more fully described and specifically claimed.

My invention is illustrated in the accompanying drawing, which shows a central vertical section of the same.

In the drawing, in which like letters of reference denote like parts, A designates the stopper, which is adapted to be inserted and permanently fixed in any vessel desired. The stopper consists of a hollow body portion B, open at the end C and provided with a flange D and closed at the other end by a wall E, which is provided with an outlet-opening F, made inwardly flaring. G is a hollow gravitating cone-shaped valve for said outlet-opening, provided with a movable weight H therein, which is adapted to aid the action of the valve. The shape of the valve, however, may be varied, and it may be made solid instead of hollow.

I J K are partitions provided with oblique perforations L. The partition K is provided with a guide-hole M for the valve, or a socket may be provided instead of said hole.

In order to allow the insertion of the valve, the stopper may be made in two parts and then joined together, or it may be made in any other suitable manner.

The operation is as follows: The stopper is placed in the neck of a vessel and either cemented or fused therein. When it is desired to remove the contents of the vessel, it is tilted, causing the valve to uncover the opening, and the liquid will then run out. Should any attempt be made to refill the vessel, the stopper will close the outlet-hole and prevent it.

Having thus described my invention, what I claim is—

1. A device for preventing the refilling of vessels comprising a hollow stopper adapted to be inserted in the mouth of a vessel, and provided with an outlet-opening in the bottom, perforated partitions one of which is provided with an opening, a valve the lower end seated in the outlet-opening, and the upper end extending into the opening in the partition and adapted to be guided thereby, substantially as described.

2. A device for preventing the refilling of vessels comprising a hollow stopper adapted to be inserted in the mouth of a vessel and provided with an outlet-opening in the bottom, a series of perforated partitions one of which is provided with an opening, a hollow valve one end adapted to be seated in the outlet-opening and the opposite end to extend into and be guided by the opening in said partition, and a movable weight in said valve, substantially as described.

In testimony whereof I affix my signature in presence of two witnesses.

WILLIAM JOSEPH MURRAY.

Witnesses:
JOS. H. BLACKWOOD,
WALTER O. BLACKWOOD.